Oct. 29, 1935.  L. E. LA BRIE  2,018,962

BRAKE

Original Filed March 12, 1928

INVENTOR.
LUDGER E. LA BRIE
BY
ATTORNEY

Patented Oct. 29, 1935

2,018,962

UNITED STATES PATENT OFFICE 2,018,962

BRAKE

Ludger E. La Brie, South Bend, Ind., assignor to Bendix Brake Company, South Bend, Ind., a corporation of Illinois Original application March 12, 1928, Serial No. 261,068. Divided and this application October 5, 1933, Serial No. 692,235

6 Claims. (Cl. 188—79.5)

This invention relates to brakes, and is illustrated as embodied in an internal expanding brake for an automobile.

An object of the invention is to improve and simplify the adjustment means of the brake, to facilitate taking up for wear.

One feature relates to the use in the adjustment of a nut or the like held by the shoe and a stamping secured to the shoe, and which preferably is formed as three sides of a rectangle completed on the fourth side by the shoe, with the nut or its equivalent fitting into the rectangular opening so formed.

This is especially useful in mounting an adjusting nut or the like on the web of an L-section brake shoe, in the angle between the rim and the web.

Another feature of the invention relates to an adjusting device especially adapted for use with the above-described adjusting nut and which comprises two threaded thrust members engaging the adjusting nuts of the two brake shoes, and which are pivotally connected by seating the rounded end of one of them in a socket formed in the end of the other.

Figure 1:
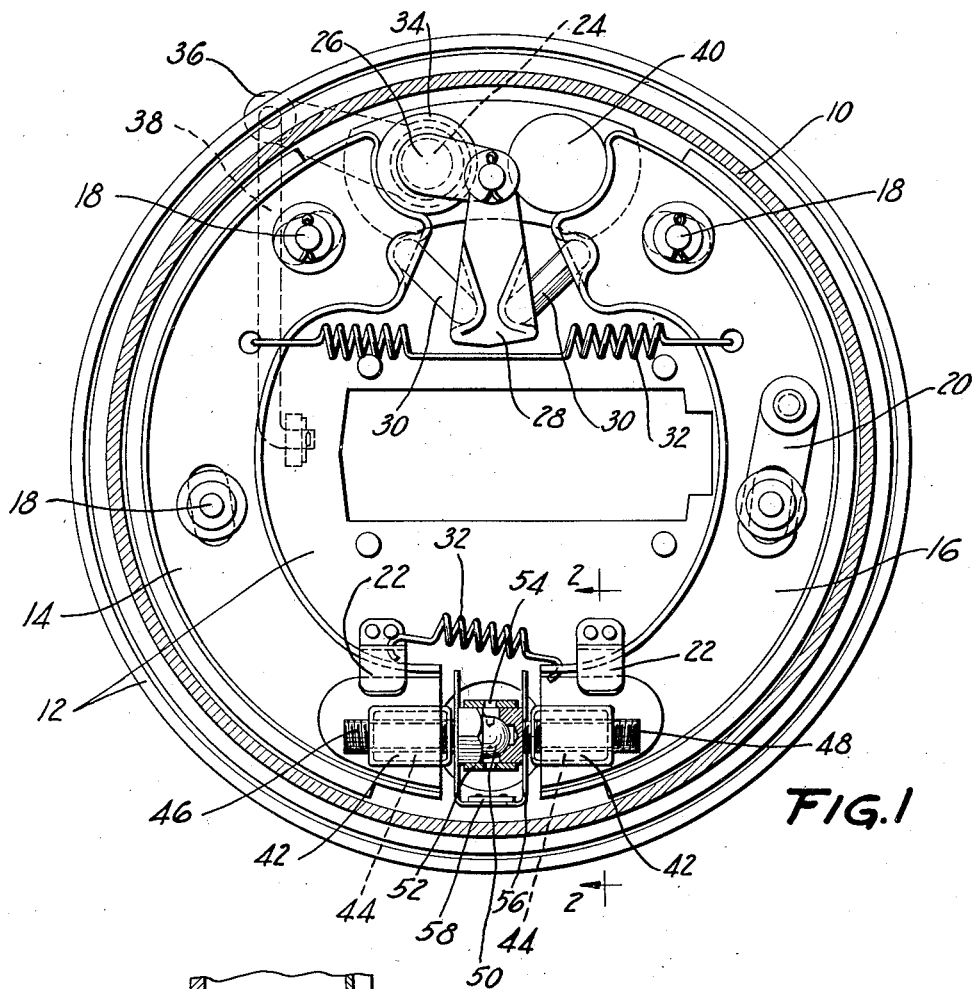
Figure 2:
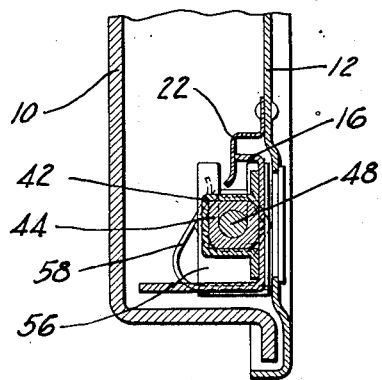

The above and other objects and features of the invention, including various novel combinations of parts and desirable particular constructions, will be apparent from the following description of the illustrative embodiment shown in the accompanying drawing, in which:

Figure 1 is a vertical section through the brake, just inside the head of the brake drum, and showing the brake shoes in side elevation; and Figure 2 is a partial section on the line 2—2 of Figure 1, showing the mounting of one of the adjusting nuts on its shoe.

The illustrative brake includes a rotatable drum 10, at the open side of which is a support such as a backing plate 12, and within which is arranged the friction means of the brake. The friction means illustrated includes two L-section shoes 14 and 16, provided with suitable steady rests and positioning devices 18 and 20 and with spring clips 22 carried by the backing plate and yieldingly holding the webs of the shoes.

The brake is applied by means such as a shaft 24 having a crank arm 26 to which is pivoted a tension element 28 having in its sides sockets pivotally receiving the rounded ends of toggle links 30 whose other ends are pivotally seated in sockets in the ends of the shoes. The brake has one or more return springs 32.

The shaft 24 may extend through the backing plate 12, shown provided with a bearing 34 for the shaft, and may conveniently have a lever 36 actuated by a link or the like 38, the lever and link being outside the brake enclosure. The shoe 14 anchors on the bearing 34 when the drum is turning clockwise, and the shoe 16 anchors on a boss 40 (integral with or fixedly secured to the backing plate) when the drum is turning counterclockwise.

Stampings 42 spot-welded or otherwise secured to the lower ends of the webs of the shoes in the angle between the rim and the web, are each drawn to form cup-shaped elements forming three sides of a square or other rectangle, the fourth side of which is formed by the shoe web. Adjusting nuts 44 are seated in these rectangles, in thrust engagement with the bottoms of the cup-shaped elements.

Thrust members 46 and 48, threaded into said nuts respectively, are pivotally connected by forming the head of the element 48 with a spherical socket or recess receiving a spherical part 50 integrally formed on the head of the member 46. The heads of elements 46 and 48 are shown loosely embraced by a short square tube 52 having openings 54 to receive a nail or other tool used by the driver in adjusting the brake.

A U-shaped leaf spring 56, having its ends slotted (see Figure 2) to slip over the thrust elements 46 and 48, is arranged to engage the heads of the elements 46 and 48 and yieldingly hold them together. This spring in turn has riveted thereto another leaf spring 58, serving as a spring pawl engaging the sides of the square sleeve 42 to hold it against unintended turning.

While one illustrative embodiment has been described in detail, it is not my intention to limit the scope of the invention to that particular embodiment, or otherwise than by the terms of the appended claims. The present application is a division of my application No. 261,068, filed March 12, 1928.

I claim:

1. An L-section shoe having a web at one side, a stamping secured at its ends to said web, and a threaded nut held by the stamping and said web.

2. A brake comprising, in combination, shoes arranged end to end, and two thrust members respectively adjustably carried by the adjacent ends of said shoes and one of which has a rounded end and the other of which has a socket receiving said rounded end.

3. A brake shoe having a stamping secured thereto at its ends to form three sides of a rectangle completed on the fourth side by said shoe, and an adjusting nut fitting in said rectangle and held by the stamping and the shoe.

4. A brake shoe having a stamping secured thereto and with the side of the shoe forming a socket opening in the direction of the shoe length, and an adjusting nut non-rotatably seated in said socket.

5. A brake shoe having a web with a cup-shaped stamping secured to the side of said web with its open end facing toward the end of the shoe.

6. A brake shoe having a web with a cup-shaped stamping secured to the side of said web with its open end facing toward the end of the shoe, in combination with an adjusting part seated therein.

LUDGER E. LA BRIE.